Oct. 31, 1950  F. S. WHITE  2,528,098
REACTOR FURNACE
Filed June 25, 1947
FIG. 1.
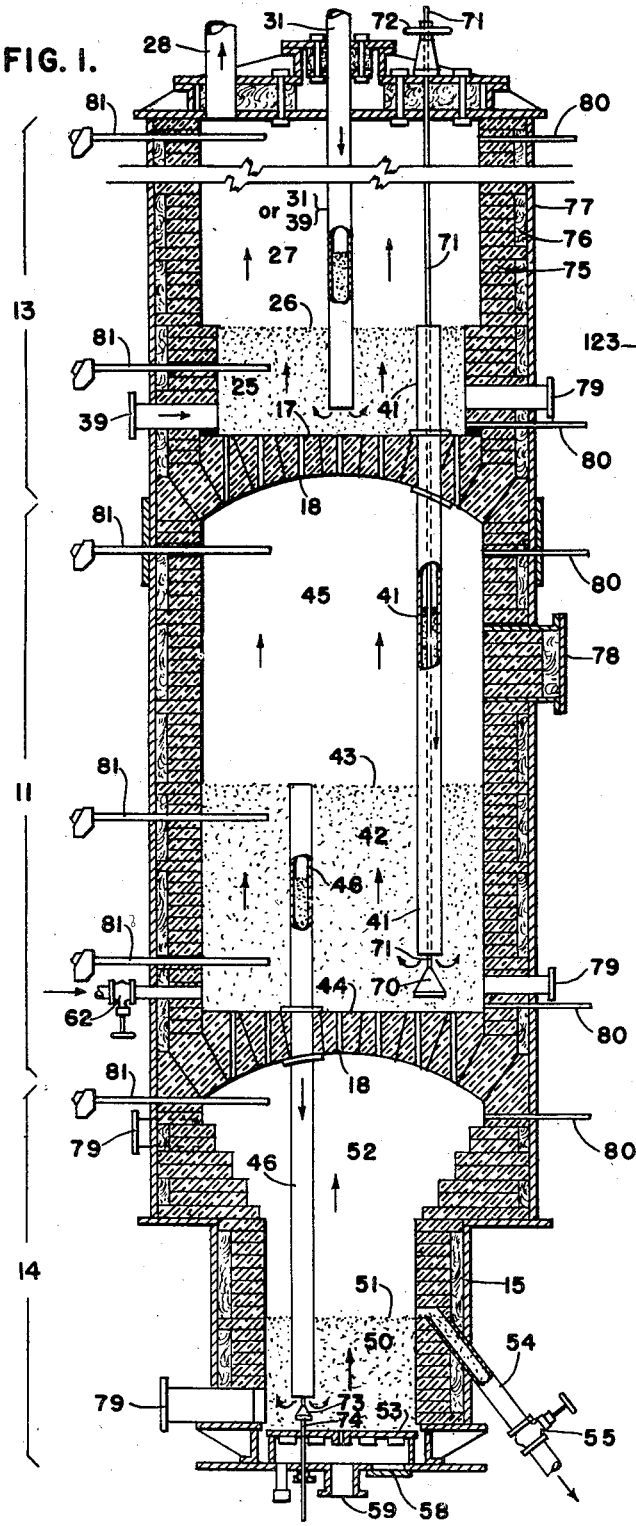
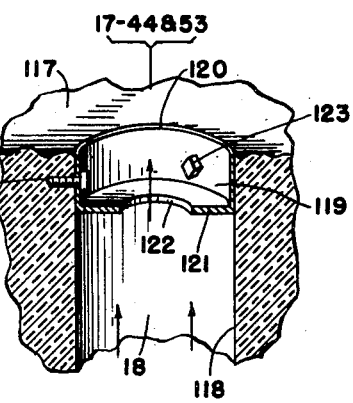
FIG. 2.
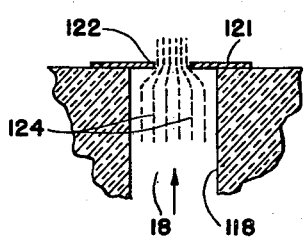
FIG. 3.
INVENTOR:
FRANK S. WHITE,
BY
Arthur Middleton
ATTORNEY

Patented Oct. 31, 1950

2,528,098

UNITED STATES PATENT OFFICE 2,528,098

REACTOR FURNACE

Frank S. White, Westport, Conn., assignor to The Dorr Company, New York, N. Y., a corporation of Delaware Application June 25, 1947, Serial No. 756,934

5 Claims. (Cl. 263—21)

This invention relates to reactor furnaces wherein finely divided solids are maintained, during heat-treatment thereof, in a mobilized or fluidized suspension in a stream of uprising gas which is to react with such solids. A reactor of this type is shown and described in the patent application of White, Ser. No. 740,151, filed April 8, 1947. In essence, it shows a reactor furnace having one or more fluidized beds of solids supported by a horizontal grid or perforated partition up through which is blown the stream of gas that fluidizes the solids of the bed. By fluidizing is meant that each solid is in suspension, more or less as solids are suspended in a water suspension. The solids are all in turbulent motion, and they act like a fluid, even to the extent of presenting a fluid-level at the top of the fluidized bed.

Gas is passed or blown upwardly through the holes or apertures in the horizontal partition or diaphragm at a velocity sufficient to fluidize the solids but insufficient to blow the suspended solids out of the reactor furnace. The holes or apertures, whose length is greater than their diameter, tend to clog up at their outlet sections, so it is an object of this invention to prevent or at least to minimize the formation of such clogging deposits from being formed in the holes or apertures in the diaphragm or partition.

This object is accomplished by providing a retarding or impeding restriction in the outlet section of each (or at least a major number) of the apertures so that the effective outlet area of the aperture through which the uprising gas must pass to be emitted from the aperture is less or reduced in diameter as compared with the diameter of the main bore of the aperture. Such a reducer seems to prevent the formation of clogging deposits or incrustations. This assures the uniform emission of gas from the apertures which is necessary for the proper dispersion of the uprising gas through the solids of the bed to fluidize them. Such a reducer seems to have odd or unexpected effects, all of which are not necessarily understood, but at least it seems to obviate the operation of centrifugal force upon the gas uprising through the aperture and prevents eddying or turbulence. The gas seems to flow smoothly through the bore of the aperture with a minimum of contacts between bore and gas because the gas constituents appear to flow in what may be termed small elongated filaments rather than in a turbulent or mobilized mass of individual or independent molecules or particles. This minimum contact of gas with the bore of the aperture is very important because those particles of gas that do not touch the bore cannot deposit any solids that may be entrained therein. Solids likely to be so entrained are usually calcareous and the phenomenon of deposition of such limelike solids resembles or is equivalent to what happens if a piece of chalk is thrown against a black-board. There is a small deposit of chalk left adhering to the black-board after the piece of chalk falls or is deflected from the board. This phenomenon seems to be duplicated in an aperture in a horizonal partition of a fluidizing reactor furnace. The turbulence, eddying and swirling superimposed on gas uprising through the aperture causes solids (however small) entrained in the gas to be deflected against the bore of the aperture and to cause a deposit to be formed on the bore as a result of such deflection. Multitudinous repetitions of such deflection builds up accretions of such deposits, until the bore of the aperture is substantially closed. Reducing the cross-sectional area of the emission zone of the aperture to critical proportions, prevents such turbulence or eddying with the result that in proportion as deflecting contacts between gas and bore are reduced, the deposition of clogging deposits on the bore is substantially eliminated.

To achieve a multi-stage or multi-bed operation of the aforementioned fluidizing treatment of solids with gases, it is necessary to divide the reactor proper into a series of compartments, by the use of horizontal apertured diaphragms or partitions which define the lower limit of each successive bed of fluidized solids, and which apertures permit of the upward flow of gas to the bed in such a manner that the solids of the bed are rendered uniformly fluidized.

For moderate temperature furnaces, such as up to 1200° F., a diaphragm comprising an apertured metal plate (sometimes called a constriction plate) properly supported, is entirely adequate. For higher temperatures, say as high as 1700° F. to 2000° F., it has been found necessary to resort to diaphragms fabricated as an arch of refractory shapes or material. Of necessity these arches are of considerable thickness to withstand the stresses encountered. Apertures or holes or bores extending through such arches for the passage of gas through the arches, have been found to become clogged and closed by a deposit of very hard scale made of dust carried by the stream of gas rising through the apertures. It has not been found possible to enlarge these apertures sufficient to deter scale formation therein, for as the gas velocities were decreased, it was no longer possible to maintain in fluidized condition, the solids of the bed above the apertured diaphragm or arch.

It has been found, however, that if the apertures or bores through the diaphragms are enlarged to a sufficient diameter so that the velocity of the gas uprising therethrough is reduced down to the order of 20 feet per second, and the aperture is capped with a thin edge orifice of heat resistant alloy material such as steel, the proper gas flow conditions can be obtained for fluidization of the bed of solids thereabove, without the formation of scale or other clogging deposits in the bores in the diaphragms. In other words, this invention proposes to use bores through the diaphragms that are larger in diameter than would be feasible per se, and then provide a reducer for each such enlarged bore, whereby the velocity of the gas uprising in the bore (on the upstream side of the reducer) as it approaches the reducer is below 30 feet per second and preferably of the order that lies in a range of from substantially 20 feet per second down to substantially 15 feet per second. Satisfactory conditions have been experienced where the hole in the reducer was not over one-half the diameter of the bore on the up-stream side of the reducer, and indeed it may be as little as one-fifth.

The best embodiment of the invention now known to me has been chosen for the purpose of illustration but it is to be understood that it is used for illustrative purposes and not for limiting ones, because obviously the invention is capable of different embodiments and structural details, so long as they fall within the ambit of the appended claims.

In the accompanying drawings, Fig. 1 is substantially like Fig. 2 of the patent application of White, Ser. No. 740,151, filed April 8, 1947, namely a vertical sectional view of a multi-stage or multi-bed reactor furnace for treating a plurality of beds of fluidized solids with gases. Fig. 2 is an enlarged partial sectional view of a detail of an orificed reducer of this invention in place within a bore of an aperture of an arch or diaphragm of the reactor furnace. Fig. 3 is also an enlarged partial vertical sectional view through a part of one aperture with an orificed reducer in place at the top of the aperture showing theoretically how gas uprises therethrough in filaments with a minimum of turbulence or eddies.

In the drawings, upper section 13, adjacent its lower end or bottom, is a gas permeable initial construction diaphragm platform or partition 17 preferably of arch construction, extending substantialy horizontally across the section 13 and provided with a multiplicity of perforations or apertures 18 upwardly through which gas may pass. The plate is made of heat-resistant metal or refractory material. Supported on and extending upwardly from the plate 17 is an initial ever-changing layer or bed of solids to be treated with gas. These solids are to be fluidized into a turbulent mobilized suspension by the gas passed upwardly therethrough at such velocities that the solids act like a fluid and present a fluid level 26, above which is free-board space 27. Rising from the top region of the initial or upper section 13 is a pipe or conduit 28 for conducting dust particles rising from the fluidized layer 25 to a cyclone (not shown). Solids separated from entrainment in the gas in the cyclone drop down through pipe 31 to the layer 25 in a region adjacent the bottom of the layer and close to the construction plate 17, since the lower end of the pipe 31 is preferably submerged in the fluidized layer, as shown.

Solids to be treated in the reactor are supplied thereto from a hopper 35 from whence they drop into a conducting or delivery tube or pipe 39 that passes through the wall of the reactor and terminates in the layer or bed 25 in a region adjacent the bottom thereof as shown.

The fluid level 26 of the layer or bed 25 is controlled by the elevation of the upper end of a spill-pipe or conduit 41 which pipe extends downwardly through the bed 25 and arch partition 17 terminating submergedly in an ever-changing layer or bed 42 under treatment in the middle section 11 of the reactor. This bed or layer is fluidized like the initial bed 25 and has a fluid level 43 as well as a free-board space 45 thereabove. This bed is supported on or from a second or middle gas permeable constriction diaphragm, platform or plate 44 perforated or apertured as at 18, the same as the initial apertured partition 17.

The fluid level 43 of the second or heat-treatment bed or layer 42 is controlled by the elevation of the upper end of a spill-pipe or conduit 46 which pipe extends downwardly through the fluidized bed 42 and partition 44, terminating submergedly in an ever-changing cooling layer or bed 50 in the bottom section 14 of the reactor. This bed is fluidized like the beds 25 and 42 and has a fluid level 51 as well as a free-board space 52 thereabove. This bed or layer 50 is supported on or from a third or bottom constriction diaphragm or partition 53, perforated or apertured as at 18, the same as in partitions 17 and 44.

The fluid level 51 of the bottom bed or layer 50 is controlled by a discharge conduit or spillpipe 54 suitably valved as at 55 that conducts treated solids to a place outside of the reactor. The bottom section 14 of the reactor terminates in a wind-box 58 having an entrance inlet 59 for compressed air or other gas, which the windbox conducts to the underside of the partition plate 53 so that air therefrom can pass upwardly through the apertures therein for the purpose of fluidizing or suspending or teetering the solids in the bed 50.

In to the middle or heat-treatment bed 42 may extend suitably valved oil injection pipes 62 terminating in that bed adjacent the bottom thereof. Spill-pipe 41 is provided with a closure valve 70, preferably at its lower end and in the form of substantially that of a cone or coned plug, which is controlled to open and close by means of a shaft 71 extending upwardly through the spill-pipe and the top or roof of the reactor to an exterior control wheel 72. Spill-pipe 46 has its lower end controllably closed by a similar coned valve 73, operated from a downwardly extending shaft 74 and an exterior control wheel similar to 72 for shaft 71.

75 indicates furnace walls of refractory bricks outside of which are sections of insulation 76 and a steel outer casing 77. 78 indicates a removable manhole to provide access to the interior of the furnace. 79 indicates various clean-out openings. 80 indicates various pressure taps, located usually at the top and bottom of each chamber. These taps indicate the pressure in that zone of the furnace where the taps are located and they are suitably connected to a manometer type indicator board that can be observed by the furnace operator. Similarly, 81 indicates various temperature indicators located generally in the top of a chamber and within the bed or layer of that chamber. These, likewise, are suitably connected to an indicator board that can be observed by the furnace operator. The apertured partitions 17 and 44, in this embodiment, are made of refractory bricks. In order that the refractory brick construction plates are strong enough to resist the temperature encountered without sagging or warping, it is desirable that the plate be arched as shown, and the bricks tapered from top to bottom.

The operation of the reactor is continuous. Assuming that it has been properly started-up and the various layers or beds are properly fluidized by the controlled velocity of gas passing upwardly therethrough, feed solids are supplied through the feed pipe 39 into the bottom section of the initial or pre-heating layer 25. Solids in layer 25 are preliminarily heated by the hot gases from free-board space 45 uprising therethrough from the apertures 18 of the arched partition 17. Dust from the bed entrained in gas rising therefrom passes through conduit 28 to the cyclone wherein the dust particles are separated from the gas and descend through pipe 31 back to the layer 25 for re-treatment, while gas escapes from the cyclone. Fluidized or teetered solids rising above the top of the spill-pipe or conduit 41 (fluid level 27), spill over the top thereof and fall down that pipe to the bottom section of the dissociation layer 42 for submerged delivery thereinto.

The main layer 42 where the major reactions are to take place, is maintained at the desired temperature and in fully fluidized or mobilized condition by gas uprising from free-board space 52 therethrough from the apertures 18 in partition 44. Treated fluidized solids rising above the top of the spill-pipe or conduit 46 (fluid level 43), spill over the top thereof and fall down that pipe to the bottom section of the cooling layer 50 to the bottom section thereof for submerged delivery thereinto.

The cooling layer 50 is maintained at cooling temperatures and in fully fluidized condition by gas rising through apertures 18 in partition 53 from the windbox 58. Cooled solids pass from the fluid level 51 of the cooling layer 50 by spilling over and into the upper end of the discharging spill-pipe or conduit 54 to discharge. In this way, each layer or bed is not only maintained fluidized but made up of ever-changing solids being treated with gas in such layers.

The main or middle layer 42 is maintained at proper temperature by being heated controllably thereto. Heating is accomplished by the use of oil, gas or finely divided coal as fuel supplied, for instance, through the pipes or burners 62 leading into that layer.

When starting up, the cone valve 73 at the bottom of spill-pipe 46 is closed; coned valve 70 at the bottom of spill-pipe 41 is closed; and valve 55 in discharge pipe 54 is also closed. Compressed air or other relatively cool gas is admitted to the wind-box 58, which flows upwardly through constriction plate 53. The burner or burners 62 are started. At this time, the solid material to be treated in the reactor, if not already fine enough, is crushed to pass a 6 mesh screen, the bulk of which, however, is coarser than 200 mesh, is delivered to the initial or pre-heating layer 25 by means of the feeder elements 31 or 39. The rising current of hot air will cause, when at a space velocity of substantially from 0.50 to 4.0 feet per second, the crushed solids to be fluidized, imparting to the mass thereof a turbulent motion simulating a boiling liquid, and like a liquid it will assume a fluid level in the layer 25. Feed solids are supplied until the layer reaches a fluid level 26 whose elevation is controlled by the upper end of the spillpipe or transfer conduit 41 and starts to drop or fall down that pipe, whereupon the coned valve 70 is opened to allow the spilling solids to fall onto the construction plate 44. This operation is continued until the level of the solids in the main or middle layer 42 is sufficient to seal the lower end of the pipe 41. When the layer 42 has been about half formed, or formed to about half its normal height, the feed is stopped. The temperature of the solids in the layer 42 is made to rise by heat from the burners. When the layer reaches an operating temperature, feeding is started again and cone valve 73 at the bottom of spill-pipe 46 is opened. Solids from layer 42 spill over into spill- or dip-pipe 46, which delivers them onto the partition 53 whereupon a layer 50 builds up to an elevation or liquid level 51 whereupon solids flow down discharge pipe 54. The hot, treated solids submergedly delivered to the layer 50 are cooled in that layer by heat exchange with the current of air uprising therethrough to maintain combustion in the dissociation layer 42. Finished product is delivered through discharge pipe 54, the flow being regulated by valve 55.

The foregoing describes, by way of illustration, a reactor furnace of the type with which this invention is to be associated, and in which it finds its environment. However, the invention may be used with a single bed reactor furnace as well as with a multi-bed furnace. The invention is illustrated in Figure 2 which is a partial view of a partition, such as 17, 44 and 53, but for identifying purposes it will be given the reference numeral 117, and an aperture 18 of any of those partitions, whose inner periphery will be referred to as the bore 118. The reducer means 119 is indicated as comprising a sleeve portion 120 having an inwardly extending annular flange 121, defining a gas-flow passage or orifice 122. The flange 121 forms a shoulder portion with the sleeve portion 120, and the flange 121 should be as thin as feasible for the thinner the better. However, it must be strong enough to resist all working forces plus, say 2100° F. So, ordinarily a thickness of ⅛ inch or more will be satisfactory. 123 indicates screw, bolt, or other means for securing the reducer means 119 in place in its aperture 18 so that it cannot inadvertently be displaced therefrom. It is preferable to have the annular flange 121 as close to the emission or outlet end of the aperture 18 (as shown in Fig. 3), but it is difficult to secure it in such position, so the position shown in Fig. 2 seems to be the more feasible. The gas-flow passage or orifice 122 is of a critical diameter that lies in a range of from substantially one-fifth to one-half the diameter of the bore 118 so this permits larger sized bores or apertures to be used than would otherwise be the case, while still effecting the necessary velocity of uprising fluidizing gas to and into the bed of solids thereabove. However, the relation of these parts should also critically be such that the velocity of the gas uprising in that portion of the bore 118 that is below the reducer 119 (or on the up-stream side thereof so far as the uprising gas is concerned) should be less than 30 feet per second and lie in a range of from substantially 20 feet per second down to substantially 15 feet per second, if clogging deposits on the bore of the aperture are to be minimized by assuring flow of gas therethrough more or less in filaments 124. The reason is that if higher velocities are realized, the gas ceases to flow in smooth filaments through the reducer and instead, form turbulent eddies which in turn produce, or tend to produce the undesired clogging deposits. The deposits are of solids, and especially calcareous solids picked up or entrained as dust by the gas in its passage to the aperture. The diameter of the orifice 122 should be small enough so that the pressure loss of gas uprising through it, expressed in equivalent inches of water, slightly exceeds the minimum pressure required for fluidization. This minimum pressure is a function of the aperture spacing on the diaphragm or partition and the bulk density of the material being fluidized. The diameter of the bore may lie between 2 to 5 inches, whereupon the diameter of the orifice lies between 3/8 inch to 1 inch respectively.

I claim:

1. In a gas permeable horizontally extending support of substantial thickness having tubular passageways therein for supporting a bed of solids in a reactor furnace, the improvement which comprises a gas passage in said support and a thin plate having an orifice of area substantially less than the area of the gas passage fixedly mounted in said gas passage so as to prevent deposition on the orifice.

2. A claim according to claim 1, wherein the area of the orifice is from 1/5 to 1/2 of the area of the gas passage with which it is associated.

3. An apparatus according to claim 1, wherein the orifice is a sleeve member with an inwardly extending annular flange fixedly mounted in the gas passage.

4. An apparatus according to claim 1, wherein the horizontally extending support is metallic and the orifice is an apertured plate welded thereon.

5. Apparatus according to claim 1, wherein the horizontally extending partition comprises an arch of refractory material and the apertures therethrough are greater in length than in diameter, and wherein the thin plate having an orifice is located within such apertures in the upper section thereof.

FRANK S. WHITE.

REFERENCES CITED

The following references are of record in the file of this patent:

UNITED STATES PATENTS

| Number | Name | Date |
| --- | --- | --- |
| 2,121,733 | Cottrell | June 21, 1938 |
| 2,123,440 | Schlafman | July 12, 1938 |
| 2,357,901 | Lewis et al. | Sept. 12, 1944 |
| 2,371,619 | Hartley | Mar. 20, 1945 |
| 2,381,119 | Dill | Aug. 7, 1945 |
| 2,389,133 | Brassert | Nov. 20, 1945 |
| 2,389,493 | Evans | Nov. 20, 1945 |
| 2,404,944 | Brassert | July 30, 1946 |
| 2,409,707 | Roetheli | Oct. 22, 1946 |